B. F. HOSLEY.
NON-SKID CHAIN FASTENING MEANS.
APPLICATION FILED FEB. 8, 1921.

1,395,712.

Patented Nov. 1, 1921.

Bert F Hosley

INVENTOR.

UNITED STATES PATENT OFFICE.

BERT F. HOSLEY, OF SYRACUSE, NEW YORK.

NON-SKID-CHAIN-FASTENING MEANS.

1,395,712.  Specification of Letters Patent.  Patented Nov. 1, 1921.

Application filed February 8, 1921. Serial No. 443,339.

*To all whom it may concern:*

Be it known that I, BERT F. HOSLEY, of Syracuse, in the county of Onondaga and State of New York, have invented a certain new and useful Non-Skid-Chain-Fastening Means, of which the following is a specification.

My invention has for its object the production of a non-skid chain fastening means for vehicle wheels similar to my Patent No. 1,318,081, granted Oct. 7, 1919, and comprises a particularly simple and efficient means of fastening said device to the spoke of a wheel and provides a construction which can be readily and economically made in a forging or malleable iron and the invention consists in the novel features and constructions hereinafter set forth and claimed.

In describing this invention, reference is had to the accompanying drawings in which like characters designate corresponding parts in all the views.

Figure 1:
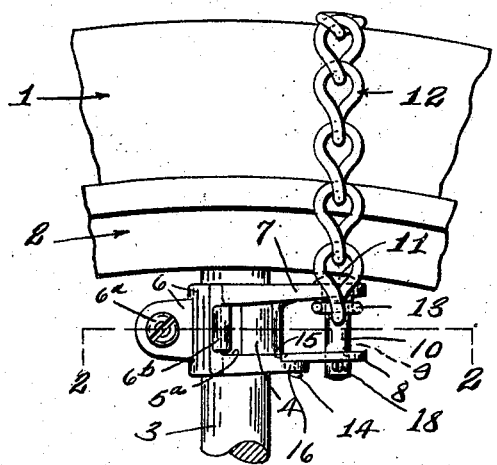
Figure 1 is a side elevation of a portion of a wheel with my chain fastening means shown thereon.
Figure 2:
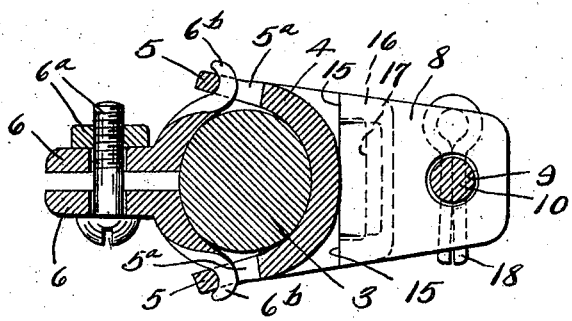
Fig. 2 is a section taken on line 2—2, Fig. 1.

My non-skid chain fastening device comprises generally, a member extending part way around the spoke of a wheel near the rim thereof and having means for holding the end links of a chain beneath the central part of the rim of a wheel on one side of said spoke, means for clamping said member to said spoke comprising parts having one end thereof interlocking with the first mentioned member and means diametrically opposite the holding means for locking the last mentioned parts together.

In the drawing, 1 is the tire, 2 the rim and 3 one of the spokes of a wheel. 4 is the body or collar of my non-skid chain fastening device and as here illustrated, extends part way around one of the spokes 3 and has its end portion 5 provided with openings or eyes 5ª.

The collar 4 is fixed to the spoke of a wheel near the rim thereof by means of duplicate clamping members 6 provided with tongue portions 6ᵇ which interlock with the end portion of said collar 4 by means of the eyes or openings 5ª.

The members 4 and 6 are tightened around the spoke by means of the nut and bolt 6ª passing through ears on the members 6.

The collar 4 is provided with spaced apart ears 7 and 8, one of said ears, as the ear 7 being formed integral therewith and the other ear 8 interlocking therewith and being removable therefrom. Each ear 7 and 8 is formed with an opening 9 through which a bolt 10 is passed.

As here illustrated the collar 4 is placed on the spoke with the ears 7 and 8 centrally alined with the center of the rim 2 and with the head 11 of the bolt held between the rim and the ear 7.

12 is the tire chain which is loosely held around the tire of the wheel with its end links 13 held by the bolt 10 between the ears 7 and 8.

The removable ear 8 is so constructed that it can be interlocked with the collar 4 and moved from inoperative position toward the ear 7 to an upright position over the end of the bolt 10, into operative position and locked in said operative position, and means is provided for preventing the ear from moving beyond its operative or upright position toward the ear 7.

As here shown, said ear 8 is provided with a tongue 14 projecting from the base thereof at an angle thereto and with bearing faces 15 on opposite ends of said tongue. The collar 4 is provided with an offset portion 16 having a slot 17 therein for receiving tongue 14 of the ear 8.

In operation, the collar 4 is clamped in position on one of the spokes with the head of the bolt 10 held between the ear 7 and the rim 2, the chain 12 is then placed around the tire with the end links 13 thereof placed over the bolt, the tongue 14 of the removable ear 8 is inserted in the slot 16 of the offset portion 16 of the collar and brought to an upright position over the end of the bolt 10 and securely held in said position by a key 18.

Owing to the arrangement of eyes 5ª on the collar 4 and the members 6, the clamping device closely hugs the spoke 3 and avoids contact with the brake drums on the rear wheels. The tightening means comes between the spokes thereby facilitating applying and removing same.

What I claim is:

1. A non-skid chain fastening means comprising a member extending part way around the spoke of a wheel near the rim thereof and having means for holding the end links of a chain beneath the central part of the rim of a wheel on one side of said spoke, means for clamping said member to said spoke comprising parts having one end thereof interlocking with the first mentioned member and means diametrically opposite the holding means for locking the last mentioned parts together, substantially as and for the purpose set forth.

2. A non-skid chain fastening means comprising a member extending part way around the spoke of a wheel near the rim thereof, and having means for holding the end links of a chain beneath the central part of the rim of a wheel on one side of said spoke, openings in the end portions of said member, means for clamping said member to said spoke comprising duplicate parts provided at one of their ends with hooks for interlocking with the openings in the first mentioned member, and means diametrically opposite the holding means for locking the duplicate parts together, substantially as and for the purpose described.

In testimony whereof, I have hereunto signed my name in the presence of two attesting witnesses, at Syracuse, in the county of Onondaga, and State of New York, this 22nd day of January, 1921.

BERT F. HOSLEY.

Witnesses:
CHAS. H. YOUNG,
G. B. PICKARD.